(12) United States Patent
Stratford et al.

(10) Patent No.: US 9,698,870 B2
(45) Date of Patent: Jul. 4, 2017

(54) SYSTEM FOR TRANSMISSION OF DATA AND POWER

(71) Applicant: Ultra Electronics Limited, Greenford, Middlesex (GB)

(72) Inventors: Francis Stratford, Gloucestershire (GB); Kevin Chinn, Gloucestershire (GB)

(73) Assignee: ULTRA ELECTRONICS LIMITED, Greenford (GB)

( * ) Notice: Subject to any disclaimer, the term of this patent is extended or adjusted under 35 U.S.C. 154(b) by 0 days.

(21) Appl. No.: 15/104,942

(22) PCT Filed: Dec. 5, 2014

(86) PCT No.: PCT/GB2014/053617
§ 371 (c)(1),
(2) Date: Jun. 15, 2016

(87) PCT Pub. No.: WO2015/101767
PCT Pub. Date: Jul. 9, 2015

(65) Prior Publication Data
US 2016/0323017 A1   Nov. 3, 2016

(30) Foreign Application Priority Data

Jan. 2, 2014   (GB) .................. 1400032.7

(51) Int. Cl.
| | | |
|---|---|---|
| *H04B 3/54* | (2006.01) | |
| *H04L 5/00* | (2006.01) | |
| *H04L 29/12* | (2006.01) | |

(52) U.S. Cl.
CPC .............. *H04B 3/548* (2013.01); *H04B 3/54* (2013.01); *H04L 5/0007* (2013.01);
(Continued)

(58) Field of Classification Search
CPC .... H04B 2203/5416; H04B 2203/5458; H04B 2203/547; H04B 2203/5483; H04B 3/548; H04B 3/54; H04L 5/0007; H04L 61/2007
See application file for complete search history.

(56) References Cited

U.S. PATENT DOCUMENTS

2004/0090312 A1 *  5/2004  Manis ................. H04B 3/54
                                             370/464
2004/0135676 A1 *  7/2004  Berkman ............. H04B 3/54
                                             370/464
(Continued)

FOREIGN PATENT DOCUMENTS

| WO | 03061260 A1 | 7/2003 |
| WO | 2008011891 A1 | 1/2008 |
| WO | 2013049897 A1 | 4/2013 |

OTHER PUBLICATIONS

International Search Report, Feb. 23, 2015 in PCT Application No. PCT/GB2014/053617.
(Continued)

*Primary Examiner* — Dac Ha
(74) *Attorney, Agent, or Firm* — Maschoff Brennan

(57) ABSTRACT

A system for transmission of data and electrical power comprising: a plurality of independent power sources, each one of the plurality of independent power sources being connected to a respective one of a plurality of electrical power lines; and a modulator configured to modulate a carrier signal with a data signal received at an input of the modulator so as to generate a modulated carrier signal at an output thereof, wherein the output of the modulator is coupled to each of the plurality of electrical power lines, to permit transmission of the modulated carrier signal over the plurality of electrical power lines, such that the plurality of
(Continued)

electrical power lines form a data network while maintaining electrical isolation between each of the plurality of electrical power lines.

13 Claims, 5 Drawing Sheets

(52) U.S. Cl.
CPC .... *H04L 61/2007* (2013.01); *H04B 2203/547* (2013.01); *H04B 2203/5416* (2013.01); *H04B 2203/5458* (2013.01); *H04B 2203/5483* (2013.01)

(56) References Cited

U.S. PATENT DOCUMENTS

| | | | | |
|---|---|---|---|---|
| 2004/0218688 A1* | 11/2004 | Santhoff | ............. | H04B 1/7163 375/295 |
| 2006/0170217 A1* | 8/2006 | Kugel | .................... | H02J 17/00 290/1 R |
| 2007/0282458 A1* | 12/2007 | Yamada | ............. | G05B 19/0423 700/2 |
| 2014/0103706 A1* | 4/2014 | Agusti Costa | ......... | H04B 3/548 307/2 |

OTHER PUBLICATIONS

Written Report mailed Feb. 23, 2015 in PCT Application No. PCT/GB2014/053617.

* cited by examiner

SYSTEM FOR TRANSMISSION OF DATA AND POWER

FIELD OF THE INVENTION

The present application relates to a system for transmission of data and power. In particular, the invention relates to a system in which data signals are transmitted over electrical power transmission lines.

BACKGROUND TO THE INVENTION

Many industrial and vehicular systems require both power and data to be provided to a sensor or actuator. For example, systems have been proposed in which a plurality of sensors and actuators are provided in individual zones of a control system.

In the proposed systems, each individual actuator requires its own power supply, whilst individual zone of the control system is provided with a plurality of sensors which provide data to a central data network of a host system. The central data network, which is typically a conventional data network, in turn provides control signals to the individual actuators, to control their operation.

The data signals transmitted by the sensors to the central data network and from the central data network to the individual actuators are carried by dedicated wired data connections. It will be appreciated that in control systems within large structures such as an aircraft wing, a significant amount of electrical cable is required for the wired data connections, which adds to the weight and cost of the structure.

SUMMARY OF THE INVENTION

According to a first aspect of the invention, there is provided a system for transmission of data and electrical power comprising: a plurality of independent power sources, each one of the plurality of independent power sources being connected to a respective one of a plurality of electrical power lines; and a modulator configured to modulate a carrier signal with a data signal received at an input of the modulator so as to generate a modulated carrier signal at an output thereof, wherein the output of the modulator is coupled to each of the plurality of electrical power lines, to permit transmission of the modulated carrier signal over the plurality of electrical power lines, such that the plurality of electrical power lines form a data network whilst maintaining electrical isolation between each of the plurality of electrical power lines.

The system of the present invention permits transmission of data over electrical power lines, and thereby obviates the need for dedicated data cabling in systems where an electrical power connection is present. This in turn leads to a reduction in the cost and weight associated with providing dedicated data cabling.

The system may further comprise a demodulator having an input coupled to each of the plurality of electrical power lines, to permit recovery of a data signal transmitted in a modulated carrier signal received over one of the plurality of electrical power lines from a remote data node.

Thus, the system permits bidirectional data communication over the electrical power lines.

The output of the modulator may be electromagnetically coupled to the plurality of power lines.

Alternatively, the output of the modulator may be capacitively coupled to the plurality of power lines.

The modulator may be configured to modulate a plurality of carrier signals with the data signal received at the input thereof.

For example, the modulator may be configured to modulate the plurality of carrier signals using an orthogonal frequency division multiplexing (OFDM) modulation scheme.

The data received at the input of the modulator may comprise Internet Protocol (IP) data packets.

The system may further comprise a further modulator configured to modulate a carrier signal with a data signal received at an input of the modulator so as to generate a modulated carrier signal at an output thereof.

This further modulator provides redundancy, to ensure that failure of the modulator does not cause failure of the entire system, as the further modulator can be brought online in the event of failure of the modulator.

The system may further comprise a remote data node coupled to one of the plurality of power lines, the remote data node having a demodulator configured to receive the modulated carrier signal and demodulate the modulated carrier signal to recover the data signal.

The remote data node may be powered by the one of the plurality of power lines.

Alternatively, the remote data node may be powered by an external power source.

The external power source may comprise a battery or capacitor which is charged by an energy harvesting device, for example.

According to a second aspect of the invention, there is provided a remote data node for use in the system of the first aspect, the remote data node comprising a demodulator configured to receive the modulated carrier signal and demodulate the modulated carrier signal to recover the data signal.

BRIEF DESCRIPTION OF THE DRAWINGS

Embodiments of the invention will now be described, strictly by way of example only, with reference to the accompanying drawings, of which.

DETAILED DESCRIPTION OF EMBODIMENTS

Figure 1:
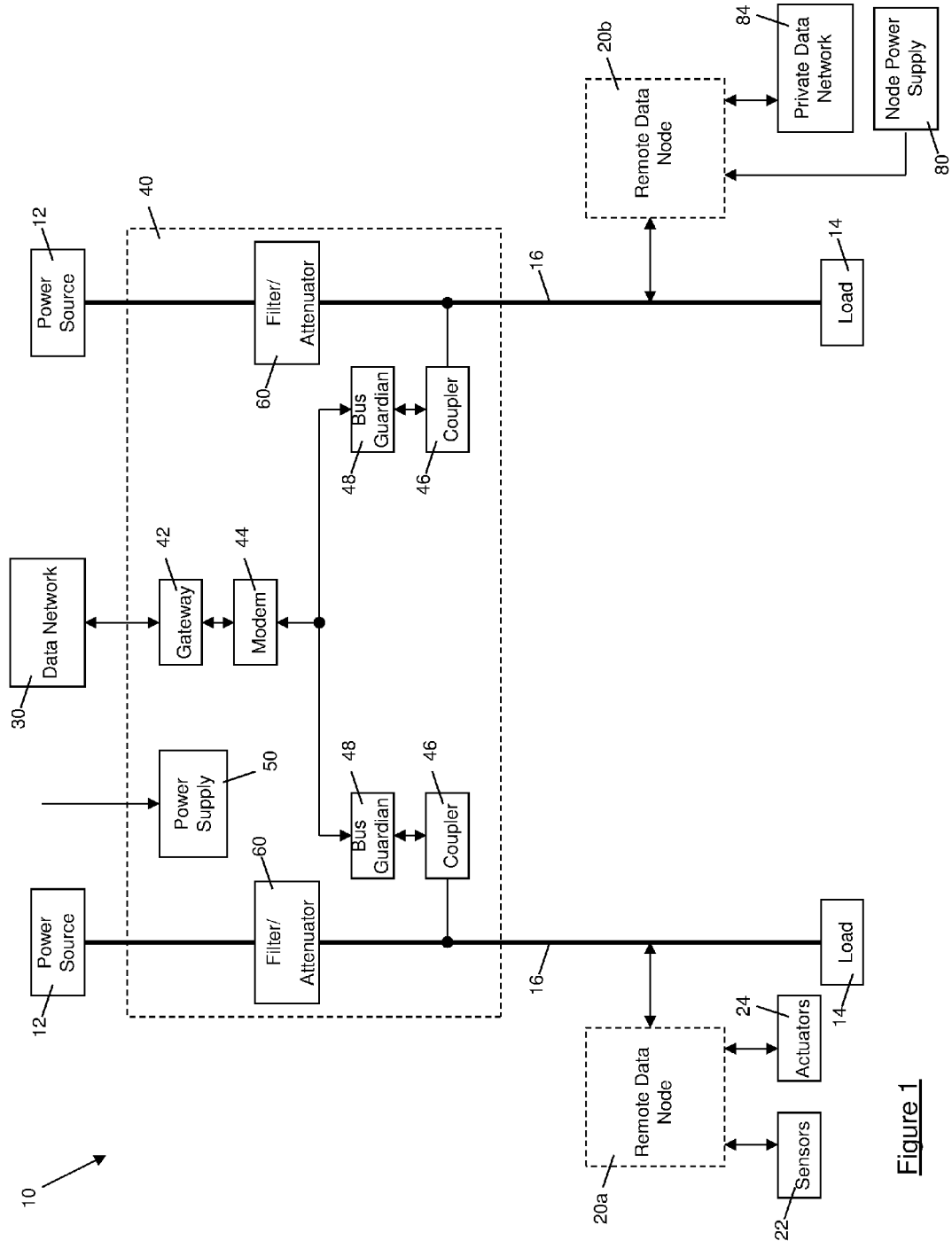
FIG. 1 is a schematic representation of an exemplary system for transmission of data and power.

Referring first to FIG. 1, an exemplary system for transmission of data and electrical power is shown generally at 10. The system 10 comprises a plurality of independent power sources 12, from which electrical power is distributed to independent loads 14 via power lines 16. In the example illustrated in FIG. 1, there are two power sources 12, two loads 14 and two power lines 16, but it is to be understood that the system 10 may include more than two power sources, loads and power lines. The loads 14 may be, for example, electro-thermal heating elements, where the system 10 is used as part of an aircraft wing ice protection system.

Coupled to the power lines 16 are remote data nodes 20a, 20b. The remote data nodes 20a, 20b receive data from sensors 22 and/or actuators 24 that are external to the remote data nodes 20a, 20b, and may also transmit data to the sensors 22 and/or actuators 24. Where the system 10 is used as part of an aircraft wing ice protection system, the sensors may include temperature sensors, for example.

Data transmitted by the sensors 22 and actuators 24 to the remote data nodes 20a, 20b is transmitted by the remote data nodes 20a, 20b to a central data network 30, which may be a generally conventional data network, using the power lines 16 as a transmission medium. Similarly, data can be transmitted from the central data network 30 to the remote data nodes 20a, 20b using the power lines 16 as a transmission medium. The central data network 30 may be, for example, an avionics data bus of an aircraft, where the system is used as part of an aircraft wing ice protection system or other aircraft sub-system.

To enable the transmission of data to and from the remote data nodes 20a, 20b using the power lines 16 as the transmission medium, the system 10 includes a data distribution node 40. The data distribution node 40 is configured to receive data from the data network 30 and to modulate the received data for transmission over the power lines 16. The data distribution node 40 is also configured to receive data from the remote data nodes 20a, 20b via the power lines 16 and demodulate the received data for onward transmission to the central data network.

To this end, the data distribution node 40 includes a gateway 42, which acts as an interface between the central data network 30 and the system 10. The gateway 42 is operative to receive digital data from the central data network 30 and to pass the received data to a modem (MOdulator/DEModulator) 44 of the data distribution node 40. This will be referred to as data transmission in a forward direction. The gateway 42 is also operative to receive data from the modem 44 and to pass the received data to the central data network 30. This will be referred to as data transmission in a reverse direction. Thus, the gateway 42 communicates bi-directionally with the central data network 30.

In the forward direction, the modem 44 receives digital data from the gateway 42 and modulates it onto a carrier signal, to permit transmission of the modulated data over the transmission lines 16. In one embodiment, the modem 44 modulates the digital data using an orthogonal frequency division multiplexing (OFDM) scheme, in which the digital data is modulated onto multiple different carrier frequencies. OFDM is a particularly suitable modulation scheme for modulating the digital data for transmission over the power lines 16, due to its ability to cope with the channel conditions present in the power lines, such as high frequency attenuation. However, it is to be understood that other modulation schemes may be used.

In the reverse direction, the modem 44 receives one or more modulated carriers carrying digital data transmitted from the remote data nodes 20a, 20b, and demodulates the carriers to recover the digital data, so that it can be transmitted, via the gateway 42, to the central data network 30. Again, in one embodiment, the digital data transmitted by the remote data nodes 20a, 20b is modulated onto multiple carrier waves using an OFDM modulation scheme, although it is to be understood that other modulation schemes may also be used.

To enable the modulated carrier signals from the modem 44 to be transmitted to the remote data nodes 20a, 20b using the power lines 16, and to enable modulated carrier signals from the remote data nodes 20a, 20b to be passed on to the modem 44, the data distribution node 40 includes bi-directional couplers 46, which couple the data distribution node 40, and more specifically the modem 44, to the power lines 16.

The couplers 46 couple the modem 44 to the power lines 16 without any direct electrical connection. For example, the couplers 46 may use electromagnetic or transformer coupling to place modulated carrier signals on the power lines 16, and to retrieve modulated carrier signals from the power lines 16. Alternatively, the couplers 46 may use capacitive coupling to place the modulated carrier signals on the power lines 16. In either case, this coupling creates a ubiquitous data network, comprising the power lines 16, central data network 30, remote data nodes 20a, 20b, sensors 22 and actuators 24 whilst maintaining electrical isolation between the power lines 16.

A bus guardian 48 is provided between each of the couplers 46 and the modem 44. The bus guardians 48 provide supervisory functions for each channel of the data distribution node 40 and the related remote data node 20a, 20b. In the event of a fault, either at the remote data node 20a, 20b or at the relevant channel of the data distribution hub 40, the relevant bus guardian 48 can operate to isolate the remote data node 20a, 20b that is served by that bus guardian 48 from the data distribution node 40, if the fault is of sufficient severity and/or persistence.

The data distribution node 40 is powered by a power supply module 50, which receives electrical power from an external power supply to supply electrical power to the data distribution node 40.

As can be seen from FIG. 1, the system 10 also includes filter/attenuators 60, which are connected in series with the power lines 16. In the example illustrated in FIG. 1, the filter/attenuators 60 are positioned within the data distribution node 40, but it will be appreciated that the filter/attenuators 60 may be positioned elsewhere on the power lines 16 or within the system 10, or may be omitted if not required. For example, the remote data nodes 20a, 20b may be provided with filter/attenuators 60 if required.

The filter/attenuators 60 are operative to attenuate the modulated carrier signals superimposed on the power lines 16, to the extent required by relevant standards. The filter/attenuators 60 may also operate as bi-directional filters, to filter noise from the power sources 12, and to prevent leakage of the modulated carrier signals upstream to the power source 12 and downstream to the loads 14.

The structure and operation of the remote data nodes 20a, 20b will now be discussed in detail with reference to FIGS. 2 and 3 of the drawings.

Figure 2:
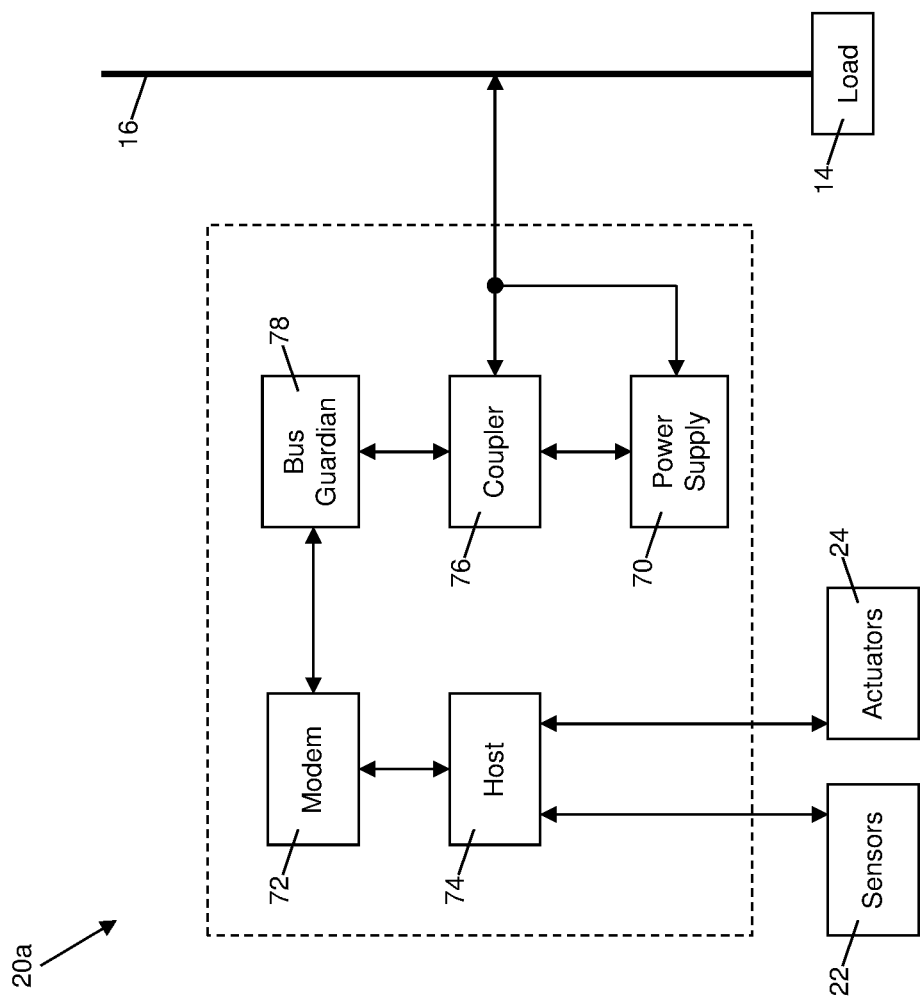
FIG. 2 is a schematic representation of a remote data node for use in the system shown in FIG. 1.

As can be seen from FIG. 2, in one embodiment a remote data node 20a draws its electrical power from the power line 16 to which it is coupled. In this embodiment, the remote data node 20a includes a power supply module 70, which is operative to draw electrical power from the power line 16 and transform the electrical power into a form usable by the remote data node 20a. For example, the electrical power line may carry high voltage direct current (HVDC) electricity to power a load 14, whereas the remote data node may require a lower voltage DC power supply. Thus, the power supply module 70 may include a DC-DC converter or other transformer arrangement to supply electrical power to the remote data node 20a in a usable form.

The remote data node 20a includes a modem 72, which is bi-directionally coupled to a host 74. The host 74 is in turn bi-directionally coupled to the sensors 22 and/or actuators 24. For example, where the system 10 is used as part of an aircraft wing ice protection system, the host 64 may be coupled both to sensors 22, in the form of temperature sensors, and to actuators 24, in the form of electrically operated switches. such as insulated gate bipolar transistors (IGBTs) or metal-oxide semiconductor field effect transistors (MOSFETs), which control electro-thermal heating elements on a wing of the aircraft.

In the forward direction, the modem 72 receives one or more modulated carrier signals transmitted via the power line 16, and demodulates the carriers to recover the digital data, which may be, for example, control or command data for the actuators 24. The modem 72 transmits the demodulated data to the host 74, which in turn passes on the demodulated data to the actuators 24.

In the reverse direction, the modem 72 receives digital data such as sensor data from the host 74, and modulates the received digital data onto a carrier signal, to permit transmission of the modulated data over the transmission lines 16. In one embodiment, the modem 72 modulates the digital data using an orthogonal frequency division multiplexing (OFDM) scheme, but it is to be understood that other modulation schemes may be used.

The host 74 acts as an interface between the modem 72 and the sensors/actuators 22/24, implementing application and communications functionality to facilitate transmission of control data from the modem 72 to the actuators 24, and transmission of sensor data from the sensors 22 to the modem 72.

The remote data node 20a also includes a bi-directional coupler 76, which couples the remote data node 20a to the power line 16. The coupler 76 couples the modem 72 to the power line 16 without any direct electrical connection. For example, the coupler 76 may use electromagnetic or transformer coupling to place modulated carrier signals on the power line 16, and to retrieve modulated carrier signals from the power lines 16. This coupling of the remote data node 20a, together with the coupling between the modem 42 of the data distribution node 40 and the other power lines 16 within the system 10, creates a ubiquitous data network, comprising the power lines 16, central data network 30 and remote data nodes 20a, whilst maintaining electrical isolation between the power lines 16.

The remote data node 20a also includes a bus guardian 78, which performs a function similar to the bus guardians 48 of the data distribution node 40, providing supervisory functions for the remote data node 20a, such that in the event of a fault of sufficient severity and/or persistence at the remote data node 20a, the remote data node 20a can be isolated from the data distribution node 40.

Figure 3:
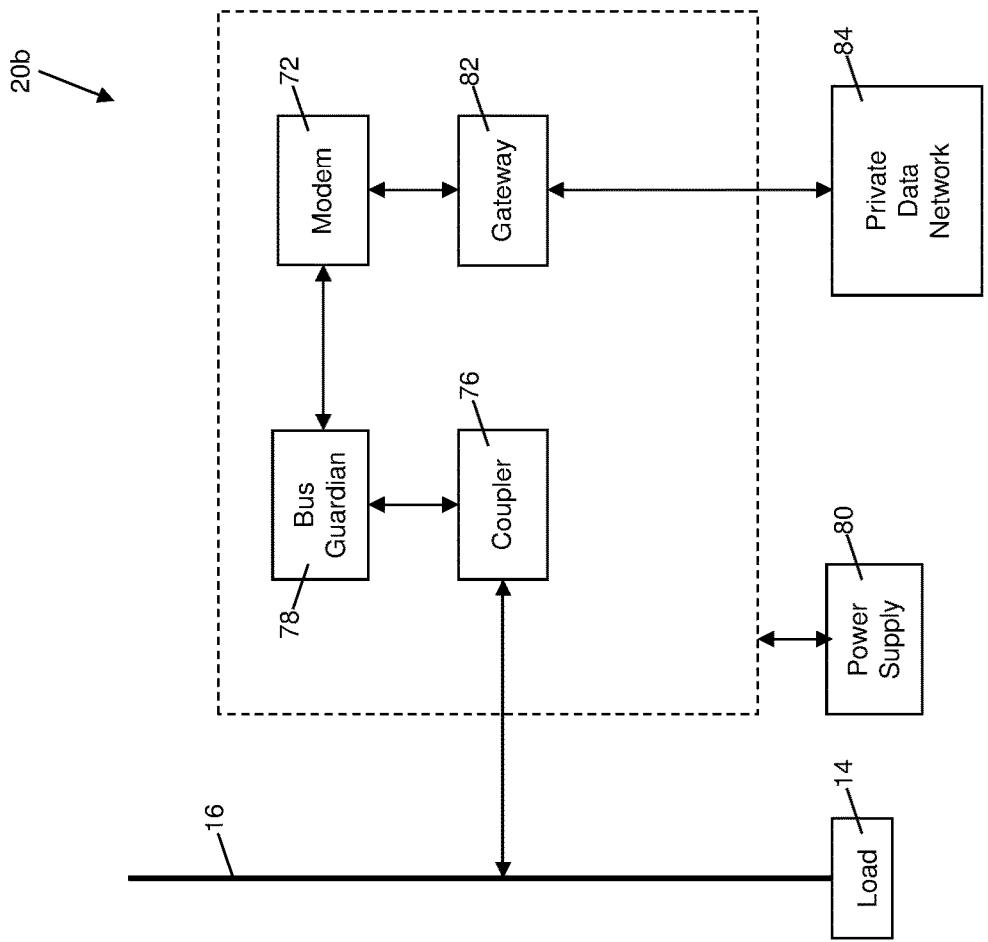
FIG. 3 is a schematic representation of an alternative embodiment of a remote data node for use in the system shown in FIG. 1.

In an alternative embodiment, illustrated in FIG. 3, a remote data node 20b does not draw electrical power from the power line 16, but instead receives power from an external power supply.

The structure and operation of the remote data node 20b are very similar to those of the remote data node 20a, and so in FIG. 3, like reference numerals denote elements that are common to both the remote data node 20a and the remote data node 20b. For the sake of clarity and brevity, those common elements will not be described in detail here.

The remote data node 20b differs from the remote data node 20a in that the remote data node 20b draws its electrical power from a dedicated external power supply 80, rather than from the power line 16. The dedicated external power supply 80 may be, for example, one or more batteries, and/or one or more capacitors or supercapacitors. The batteries and/or capacitors/supercapacitors may store electricity generated by energy harvesting devices that convert, for example, kinetic energy into electricity.

The remote data node 20b also differs from the remote data note 20a in that it includes a gateway 82, which acts as an interface between a modem 72 of the remote data node 20b and a private data network 84. The private data network 84 may be, for example, a private data network used by sensors and actuators of the system 10 to transmit command and sensor data. Thus, the remote data node 20b is not necessarily directly connected to any sensors or attenuators, but may instead transmit and receive command and sensor data via the private data network 84 to sensors and/or actuators.

As in the remote data node 20a described above, in the forward direction, the modem 72 receives one or more modulated carrier signals transmitted via the power line 16, and demodulates the carriers to recover the digital data, which may be, for example, command data. The modem 72 transmits the demodulated data to the gateway 82, which in turn passes on the demodulated data.

In the reverse direction, the modem 72 receives digital data such as sensor data from the gateway 82, and modulates the received digital data onto a carrier signal, to permit transmission of the modulated data over the transmission lines 16. In one embodiment, the modem 72 modulates the digital data using an orthogonal frequency division multiplexing (OFDM) scheme, but it is to be understood that other modulation schemes may be used.

It will be appreciated that the two different types of remote data node 20a and 20b are interoperable, that is to say that the system 10 may include both remote data nodes 20a and remote data nodes 20b. Equally, the system 10 may include exclusively one type of remote data node 20a, 20b. Furthermore, the system 10 may include multiple remote data nodes 20a, 20b associated with one or each of the power lines 16.

In some embodiments, the central data network 30, remote data nodes 20a, 20b and private data network 84 operate under the conventional Internet Protocol (IP) to transmit packets of data from one element of the system 10 to another element of the system 10. The use of IP enables data packets to be addressed to the relevant element of the system 10 without requiring complex switching or multiplexing. However, it will be appreciated that any suitable communications protocol could equally be employed. For example, the central data network 30, remote data nodes 20a, 20b and private data network 84 may operate under a CAN (controller area network), TTP (time triggered protocol) or other suitable networking protocol.

For example, a command may be generated at the central data network 30 to cause a selected one of the actuators 24 to operate. The command is transmitted as one or more IP data packets, each of which is addressed to the selected one of the actuators 24. The packets are transmitted by the gateway 42 to the modem 44, which modulates them onto one or more carriers for onward transmission, as described above. The modulated carriers are transmitted in parallel to all of the bi-directional couplers 46 illustrated in FIG. 1, such that the data packets are transmitted, via the power lines 16, to all of the remote data nodes 20a, 20b. At the remote data nodes 20a, 20b, the modulated carriers are demodulated by the modems 72 to recover the data packets representing the command. The data packets are decoded by the host 74 in the remote data node 20a to determine their destination, and are passed on to the appropriate sensors 22 and/or actuators 24. In the remote data node 20b, the data packets are passed on by the gateway 82 to the private data network 84. The actuator 24 to which the packets are addressed (i.e. the actuator 24 having an address that corresponds to the address in the address field of the data packets) carries out the command. All other elements of the system simply ignore the command, since the data packets representing the command are not addressed to them.

Thus, the use of an Internet Protocol based data network facilitates the transmission of data between elements of the system 10 without requiring complex switching or multiplexing arrangements. Instead, IP data packets are effectively broadcast to all elements of the system 10, and are acted upon only by those elements to which the data packets are addressed.

Figure 4:
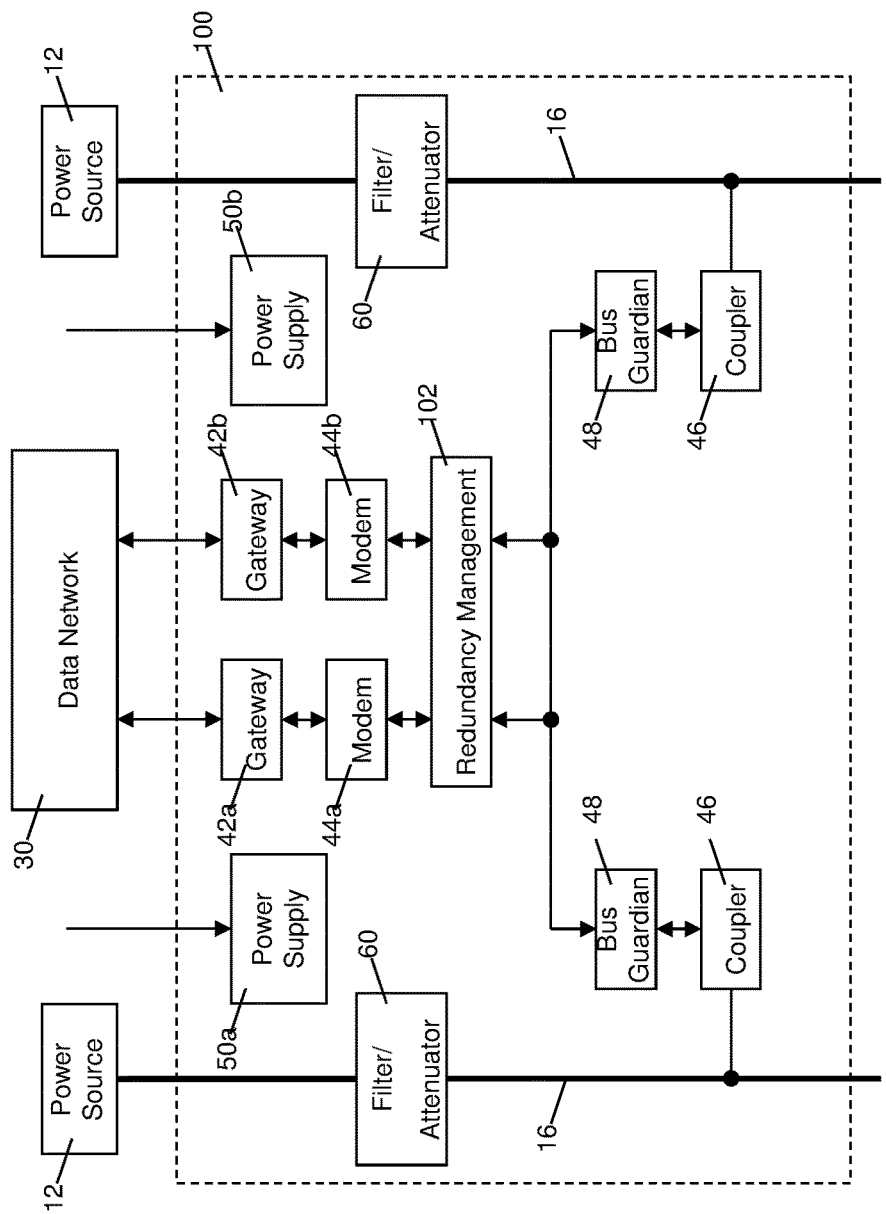
FIG. 4 is a schematic representation of an embodiment of a data distribution node suitable for use in the system shown in FIG. 1.

FIG. 4 is a schematic representation of an alternative embodiment of a data distribution node 100. The data distribution node 100 includes many of the elements of the data distribution node 40 described above and illustrated in FIG. 1, and so like reference numerals have been used to designate like elements. For the sake of clarity and brevity those common elements will not be described in detail here.

The data distribution node 100 illustrated in FIG. 4 differs from the data distribution node 40 illustrated in FIG. 1 in that it includes duplicate gateways 42a, 42b, duplicate modems 44a, 44b and duplicate power supply modules 50a, 50b. The gateways 42a, 42b of the data distribution node 100 operate in the same manner as the gateway 42 of the data distribution node 40, receiving data from the central data network 30 and pass it on to the modems 44a, 44b. Similarly, the modems 44a, 44b of the data distribution node 100 operate in the same manner as the modem 44 of the data distribution node 40. The power supply modules 50a, 50b, each receive electrical power from an external power supply to power a respective pair of duplicate gateways 42a, 42b and modems 44a, 44b.

The duplicate gateways 42a, 42b, modems 44a, 44b and power supply modules 50a, 50b are provided for the purpose of redundancy, such that in the event of the failure of one of the gateways 42a, 42b, modems 44a, 44b or power supply modules 50a, 50b, the relevant duplicate gateway 42b, 42a, modem 44b, 44a or power supply module 50b, 50a can be activated, to ensure that there is minimal loss of functionality.

To manage the operation of the duplicate gateways 42a, 42b modems 44a, 44b and power supply modules 50a, 50b, the data distribution node 100 is provided with a redundancy management unit 102. The redundancy management unit 102 is configured to monitor the duplicate modems 44a, 44b and gateways 42a, 42b and to disable an active modem 44a and its associated gateway 42b in the event of a fault or loss of power of sufficient severity or persistence. The redundancy management unit 102 simultaneously enables the duplicate modem 44b and its associated gateway 42a. In this way, failure of a single modem 44a, 44b, gateway 42a, 42b or power supply module 50a, 50b does not compromise the operation of the entire system 10.

Although FIG. 1 illustrates a system 10 in which a single remote data node 20a, 20b is coupled to each of the two power lines 16, it will be appreciated that multiple remote data nodes 20a, 20b may be coupled to a single power line 16, and that any combination of remote data nodes 20a, 20b may be coupled to a power line 16. This is illustrated schematically in FIG. 5.

Figure 5:
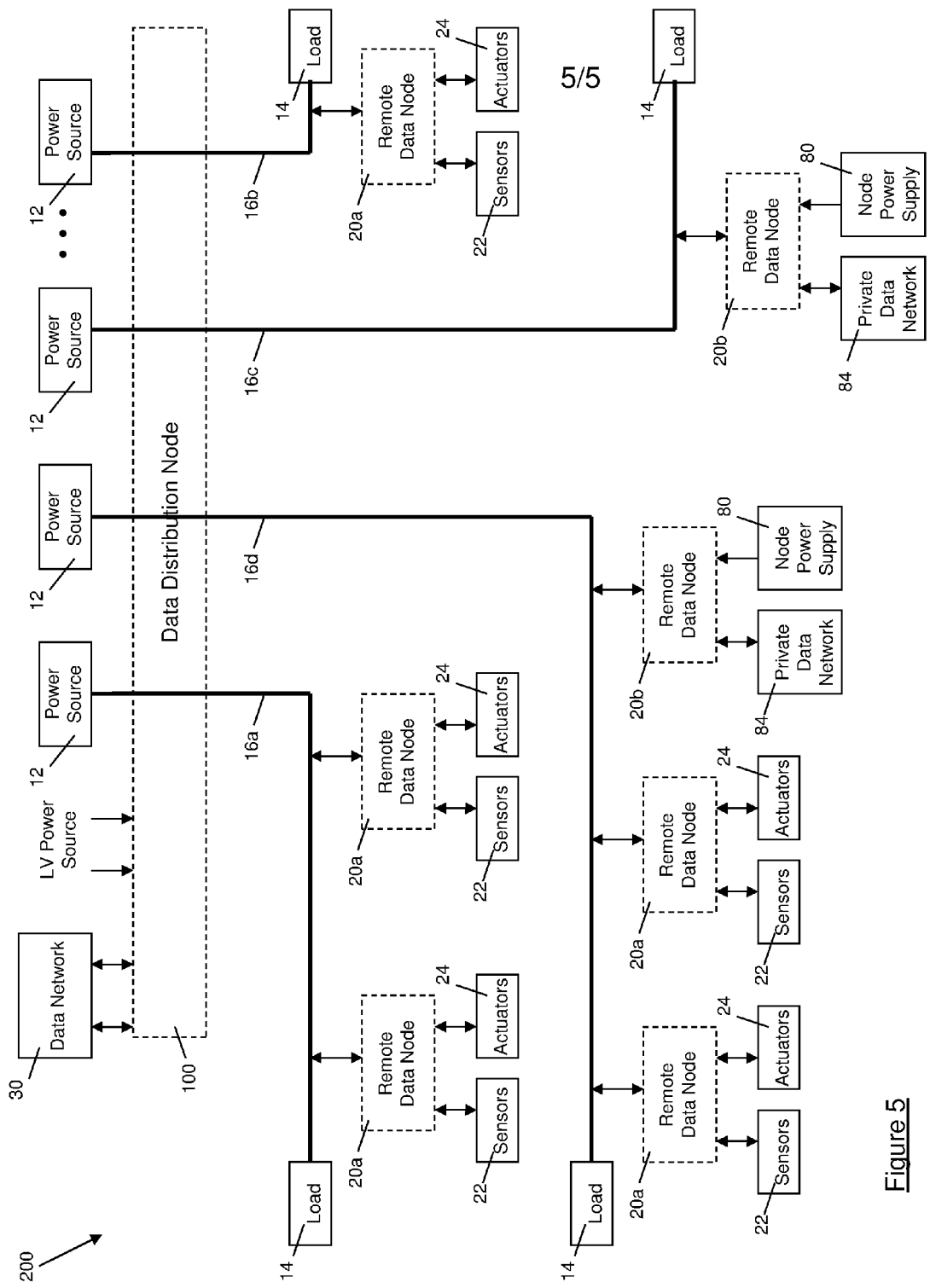
FIG. 5 is a schematic representation of a exemplary system for transmission of data and power over multiple power lines, in which multiple remote data nodes are coupled to individual power lines.

In FIG. 5, an exemplary system for transmission of data and electrical power is shown generally at 200. The system 200 includes many of the elements of the system 10 described above and illustrated in FIG. 1, and so like reference numerals have been used to designate like elements. For the sake of clarity and brevity those common elements will not be described in detail here.

The system 200 comprises a dual redundant data distribution node 100 of the type described above and illustrated in FIG. 4, which is operative to couple data signals to, and decouple data signals from, a plurality (in this example 4) of power lines 16a, 16b, 16c, 16d.

As can be seen in FIG. 5, two remote data nodes 20a of the type described above and illustrated in FIG. 2, are coupled to a first power line 16a, whilst a single remote data node 20a of the type described above and illustrated in FIG. 2 is coupled to a second power line 16b. A single remote data node 20b of the type described above and illustrated in FIG. 3 is coupled to a third power line 16c. A further two remote data nodes 20a of the type described above and illustrated in FIG. 2 and a further single remote data node 20b of the type described above and illustrated in FIG. 3 are coupled to a fourth power line 16d.

Thus, the system 200 of FIG. 5 supports multiple power lines, with multiple remote data nodes on a single power line, and also supports a mixture of different types of remote data nodes on a single power line.

As will be appreciated from the foregoing, the system 10 described herein provides a flexible and reliable way for transmitting data over an electrical power network, and can be used to reduce the cost and weight associated with data cabling in systems where both data and power connections are required.

Although the system 10 has been described in the exemplary context of an aircraft wing ice protection system, it will be apparent to those skilled in the relevant arts that the principles of the system 10 are equally applicable to a great many applications and transportation platforms.

Although the invention has been described above with reference to one or more preferred embodiments, it will be appreciated that various changes or modifications may be made without departing from the scope of the invention as defined in the appended claims.

The invention claimed is:

1. A system for transmission of data and electrical power, the system comprising:
    a plurality of independent power sources, each one of the plurality of independent power sources being connected to a respective one of a plurality of electrical power lines; and
    a modulator configured to modulate a carrier signal with a data signal received at an input of the modulator so as to generate a modulated carrier signal at an output thereof,
    wherein the output of the modulator is coupled to each of the plurality of electrical power lines, to permit transmission of the modulated carrier signal over the plurality of electrical power lines, such that the plurality of electrical power lines form a data network whilst maintaining electrical isolation between each of the plurality of electrical power lines.

2. The system according to claim 1, further comprising:
    a demodulator having an input coupled to each of the plurality of electrical power lines, to permit recovery of a data signal transmitted in a modulated carrier signal received over one of the plurality of electrical power lines from a remote data node.

3. The system according to claim 1, wherein the output of the modulator is electromagnetically coupled to the plurality of power lines.

4. The system according to claim 1 wherein the output of the modulator is capacitively coupled to the plurality of power lines.

5. The system according to claim 1, wherein the modulator is configured to modulate a plurality of carrier signals with the data signal received at the input thereof.

6. The system according to claim 5 wherein the modulator is configured to modulate the plurality of carrier signals using an orthogonal frequency division multiplexing (OFDM) modulation scheme.

7. The system according to claim 1, wherein the data received at the input of the modulator comprises Internet Protocol (IP) data packets.

8. The system according to claim 1, further comprising a further modulator configured to modulate a carrier signal with a data signal received at an input of the modulator so as to generate a modulated carrier signal at an output thereof.

9. The system according to claim 1, further comprising a remote data node coupled to one of the plurality of power lines, the remote data node having a demodulator configured to receive the modulated carrier signal and demodulate the modulated carrier signal to recover the data signal.

10. The system according to claim 9 wherein the remote data node is powered by the one of the plurality of power lines.

11. The system according to claim 9 wherein the remote data node is powered by an external power source.

12. The system according to claim 11 wherein the external power source comprises a battery or capacitor which is charged by an energy harvesting device.

13. A remote data node for use in the system of claim 1, the remote data node comprising a demodulator configured to receive the modulated carrier signal and demodulate the modulated carrier signal to recover the data signal, wherein the remote data node comprises a bus guardian, wherein the bus guardian is operative to isolate the remote data node from the data distribution node in the event of a fault at the remote data node.

* * * * *